(12) United States Patent
Vishne et al.

(10) Patent No.: US 11,836,384 B2
(45) Date of Patent: Dec. 5, 2023

(54) AUTOMATIC PREDICTION TIMERS ADAPTATION

(71) Applicant: Western Digital Technologies, Inc., San Jose, CA (US)

(72) Inventors: Gadi Vishne, Petach-Tikva (IL); Michal Silbermintz, Tel-Mond (IL); Danny Berler, Tel-Mond (IL)

(73) Assignee: Western Digital Technologies, Inc., San Jose, CA (US)

( * ) Notice: Subject to any disclaimer, the term of this patent is extended or adjusted under 35 U.S.C. 154(b) by 1 day.

(21) Appl. No.: 17/654,369

(22) Filed: Mar. 10, 2022

(65) Prior Publication Data
US 2023/0289093 A1 Sep. 14, 2023

(51) Int. Cl.
*G06F 3/06* (2006.01)

(52) U.S. Cl.
CPC .......... *G06F 3/0659* (2013.01); *G06F 3/061* (2013.01); *G06F 3/0679* (2013.01)

(58) Field of Classification Search
CPC ....... G06F 3/061; G06F 3/0659; G06F 3/0679
See application file for complete search history.

(56) References Cited

U.S. PATENT DOCUMENTS

| | | | |
|---|---|---|---|
| 5,603,001 A * | 2/1997 | Sukegawa | G06F 3/0601 714/E11.038 |
| 8,438,356 B2 | 5/2013 | Yoon et al. | |
| 10,528,269 B2 | 1/2020 | Elliott | |
| 10,528,512 B1 * | 1/2020 | Pachkov | G06F 13/4068 |
| 10,664,168 B2 | 5/2020 | Canepa et al. | |
| 10,838,653 B2 | 11/2020 | Yang | |
| 11,150,841 B2 | 10/2021 | Ellis et al. | |

OTHER PUBLICATIONS

Shin et al. "Dynamic Interval Polling and Pipelined Post I/O Processing for Low-Latency Storage Class Memory," HotStorage, 2013, 5 pages.

* cited by examiner

*Primary Examiner* — Larry T MacKall
(74) *Attorney, Agent, or Firm* — PATTERSON + SHERIDAN, LLP; Steven H. VerSteeg

(57) ABSTRACT

Data storage devices function by communication between a controller and a memory device over a data bus. The memory device can, at times, be busy. Attempting to communicate with the memory device while the memory device is busy causes delays. Holding back communications when the memory device is not busy causes avoidable delays. Correctly predicting the timing of when the memory device is available will reduce delays. An adaptive prediction timer is used that increases the time between communications if a status check of the memory device returns a busy indication, and decreases the time between communications if the status check returns a not busy indication.

18 Claims, 9 Drawing Sheets

AUTOMATIC PREDICTION TIMERS ADAPTATION

BACKGROUND OF THE DISCLOSURE

Field of the Disclosure

Embodiments of the present disclosure generally relate to efficient bus utilization in a data storage device.

Description of the Related Art

Data storage devices interact with a host device to store data, as instructed by the host device, or retrieve data requested by the host device. To store data, the host device sends a write command to the data storage device. The data storage device uses a controller having a flash interface module (FIM) to write the data to the memory device of the data storage device and deliver an indication to the host device that the write command was successful. To retrieve data, the host device sends a read command to the data storage device to read data from the memory device. The data storage device executes the read command and delivers an indication to the host device that the read was successful.

The host device will oftentimes send read and/or write commands to the data storage device in an amount that is greater than the memory device can process at one time. The commands are queued and processed in coordination with the memory device based upon the memory device availability by sending the commands through the FIM over a data bus to the memory device. If the command is sent to the memory device too early, the memory device is not ready to process the command and hence, delays ensue. Conversely, if controller waits too long to send the command to the memory device, the memory device will have been idle and hence, delays ensue. The delays decrease quality of service (QoS) for the data storage device.

The controller of the data storage device can check the status of the memory device. The checking the memory status is performed by sending 'check status' commands over a data bus, and the 'check status' commands catches the data bus, which is used for more than one memory device.

Therefore, there is a need in the art for an improved timing of sending 'check status' commands to a memory device for processing.

SUMMARY OF THE DISCLOSURE

Data storage devices function by communication between a controller and a memory device. The memory device can, at times, be busy and thus unable to receive commands from the controller. Attempting to check the memory device status while the memory device is busy, involves rechecking the status and catches the data bus and causes delays to other memory devices that can't use the data bus. Holding back checking the status when the memory device is not busy causes avoidable delays. Correctly predicting the timing of when the memory device is available will reduce delays. An adaptive prediction timer is used that increases the time between communications if a status check of the memory device returns a busy indication, and decreases the time between communications if the status check returns a not busy indication.

In one embodiment, a data storage device comprises: a memory device; and a controller coupled to the memory device via a data bus, wherein the controller is configured to: set a value for a timer that predicts availability of the memory device; receive a first command; send the command for processing to the memory device; check status of the memory device; determine the memory device is available; and decrease the value of the timer.

In another embodiment, a data storage device comprises: a memory device; and a controller coupled to the memory device via a data bus, wherein the controller is configured to: set a value for a timer that predicts availability of the memory device; receive a first command; check status of the memory device; determine the memory device is not available; and increase the value of the timer.

In another embodiment, a data storage device comprises: memory means; a controller coupled to the memory means, wherein the controller is configured to: send commands to the memory means for processing; coordinate timing of sending the commands to the memory means; and adaptively adjusting timing of sending the commands based upon determining whether the memory means is busy.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, a reference to "the disclosure" shall not be construed as a generalization of any inventive subject matter disclosed herein and shall not be considered to be an element or limitation of the appended claims except where explicitly recited in a claim(s).

Data storage devices function by communication between a controller and a memory device over a data bus. The memory device can, at times, be busy. Attempting to communicate with the memory device while the memory device is busy causes delays. Holding back communications when the memory device is not busy causes avoidable delays. Correctly predicting the timing of when the memory device is available will reduce delays. An adaptive prediction timer is used that increases the time between communications if a status check of the memory device returns a busy indication, and decreases the time between communications if the status check returns a not busy indication.

Figure 1:
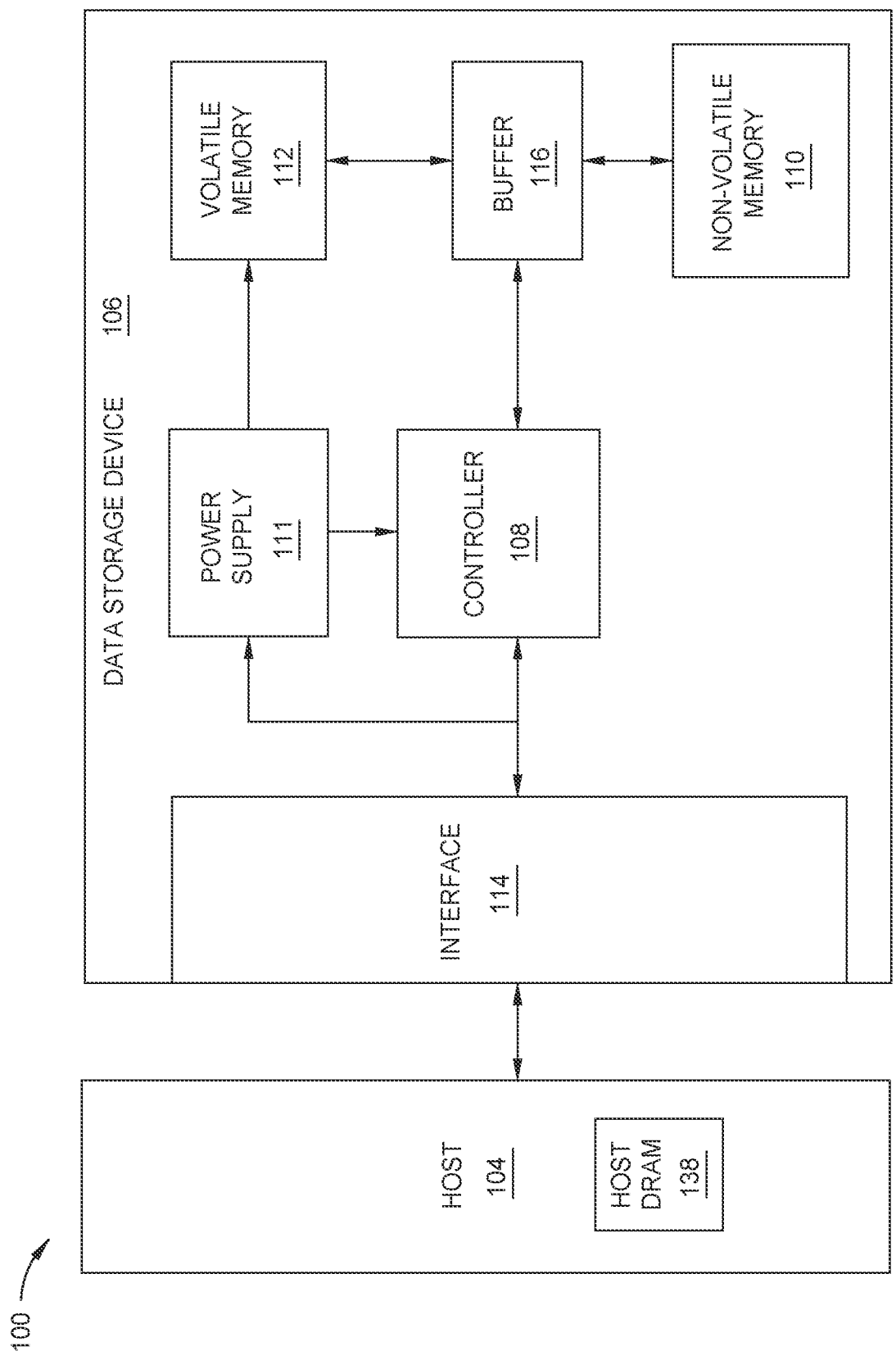
FIG. 1 depicts a schematic block diagram illustrating a storage system in which a data storage device may function as a storage device for a host device, according to certain embodiments.

FIG. 1 depicts a schematic block diagram illustrating a storage system 100 in which data storage device 106 may function as a storage device for a host device 104, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, an interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106, or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered) to a motherboard of the host device 104.

The interface 114 of the data storage device 106 may include one or both of a data bus for exchanging data with the host device 104 and a control bus for exchanging commands with the host device 104. The interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. The electrical connection of the interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of the interface 114 may also permit the data storage device 106 to receive power from the host device 104. For example, as illustrated in FIG. 1, the power supply 111 may receive power from the host device 104 via the interface 114.

The NVM 110 may include a plurality of memory devices or memory units. NVM 110 may be configured to store and/or retrieve data. For instance, a memory unit of NVM 110 may receive data and a message from the controller 108 that instructs the memory unit to store the data. Similarly, the memory unit of NVM 110 may receive a message from the controller 108 that instructs the memory unit to retrieve data. In some examples, each of the memory units may be referred to as a die. In some examples, a single physical chip may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit of NVM 110 may include any type of non-volatile memory devices, such as flash memory devices, phase-change memory (PCM) devices, resistive random-access memory (ReRAM) devices, magnetoresistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR based flash memory devices and may store data based on a charge contained in a floating gate of a transistor for each flash memory cell. In NVM flash memory devices, the flash memory device may be divided into a plurality of dies, where each die of the plurality of dies includes a plurality of blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multilevel cell (MLC), triple level cell (TLC), or quad level cell (QLC). The controller 108 may write data to and read data from NVM flash memory devices at the page level and erase data from NVM flash memory devices at the block level.

The data storage device 106 includes a power supply 111, which may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via the interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The data storage device 106 also includes volatile memory 112, which may be used by controller 108 to store information. Volatile memory 112 may include one or more volatile memory devices. In some examples, the controller 108 may use volatile memory 112 as a cache. For instance, the controller 108 may store cached information in volatile memory 112 until cached information is written to non-volatile memory 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

The data storage device 106 includes a controller 108, which may manage one or more operations of the data storage device 106. For instance, the controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. The controller 108 may determine at least one operational characteristic of the storage system 100 and store the at least one operational characteristic to the NVM 110. In some embodiments, when the data storage device 106 receives a write command from the host device 104, the controller 108 temporarily stores the data associated with the write command in the internal memory or write buffer 116 before sending the data to the NVM 110.

Figure 2:
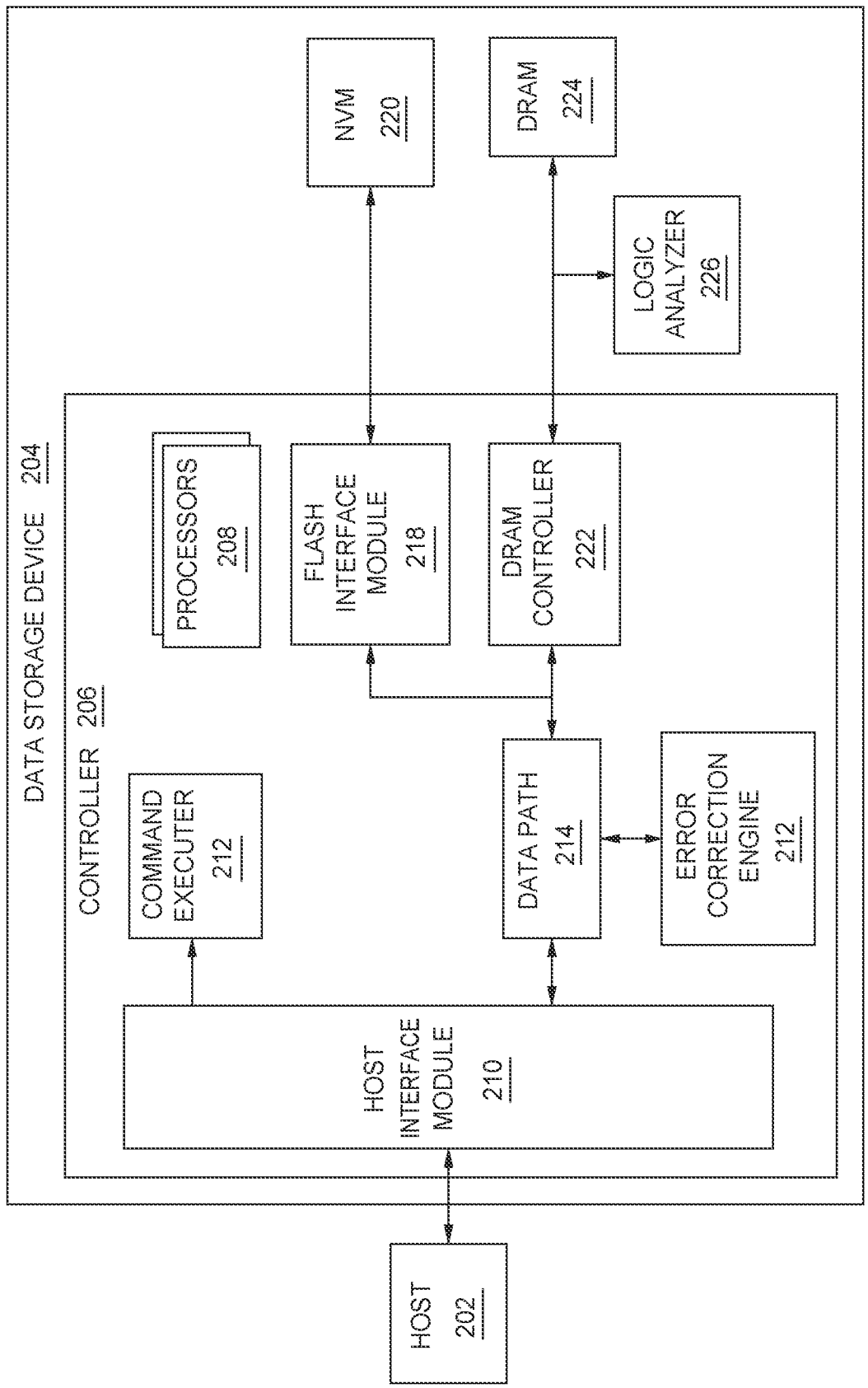
FIG. 2 depicts a schematic block diagram illustrating a high level block diagram of a device controller in a data storage device, according to certain embodiments.

FIG. 2 depicts a schematic block diagram 200 illustrating a high level block diagram of a device controller 206 in a data storage device 204, according to certain embodiments. Aspects of the storage system 100 may be similar to those described in FIG. 2. The host device 202 may be the host device 104. The data storage device 204 may be the data storage device 106, and the controller 206 may be the controller 108. NVM 220 may be the NVM 110. DRAM 224 may be the volatile memory 112.

The controller 206 includes a host interface module (HIM) 210 configured to receive and send data between the host device 202 and the controller 206. The controller 206 further includes a command executer 212 coupled to the HIM 210. The command executer 212 may be configured to execute read and write commands received from the host device 202. Furthermore, the controller 206 further includes a data path 214 coupled to the HIM 210 and an error correction engine 216 coupled to the data path 214. When data is received from the host device 202, the data passes through the HIM 210 to the data path 214. The data path 214 may include read gateways, write gateways, registers, and the like. The data is passed to an error correction engine 216, where the data may be encoded with error correction code (ECC) and/or XOR parity data.

After the data is encoded, the data is passed to either DRAM controller 222 or flash interface module (FIM) 218, depending on the relevant write location of the data. The FIM 218 is coupled to the NVM 220, where the FIM 218 accesses and schedules the write to and reads from the NVM 220. Likewise, the DRAM controller 222 accesses and schedules the write to and reads from the DRAM 224. The DRAM controller 222 may be configured to execute a method of partial write accesses utilizing masked write transactions to the DRAM 224.

The controller includes an input/output (I/O) to a logic analyzer 226 via a data bus. In some examples, the logic analyzer 226 is coupled to the interface of the DRAM 224. The controller 206 further includes one or more processors 208. The one or more processors 208 may be configured to perform calculations that run the controller 206 or the data storage device 204. The one or more processors 208 may perform arithmetical, logical, input/output (I/O) and other basic instructions that are passed from the data storage device 204 firmware or the host device 202.

Figure 3:
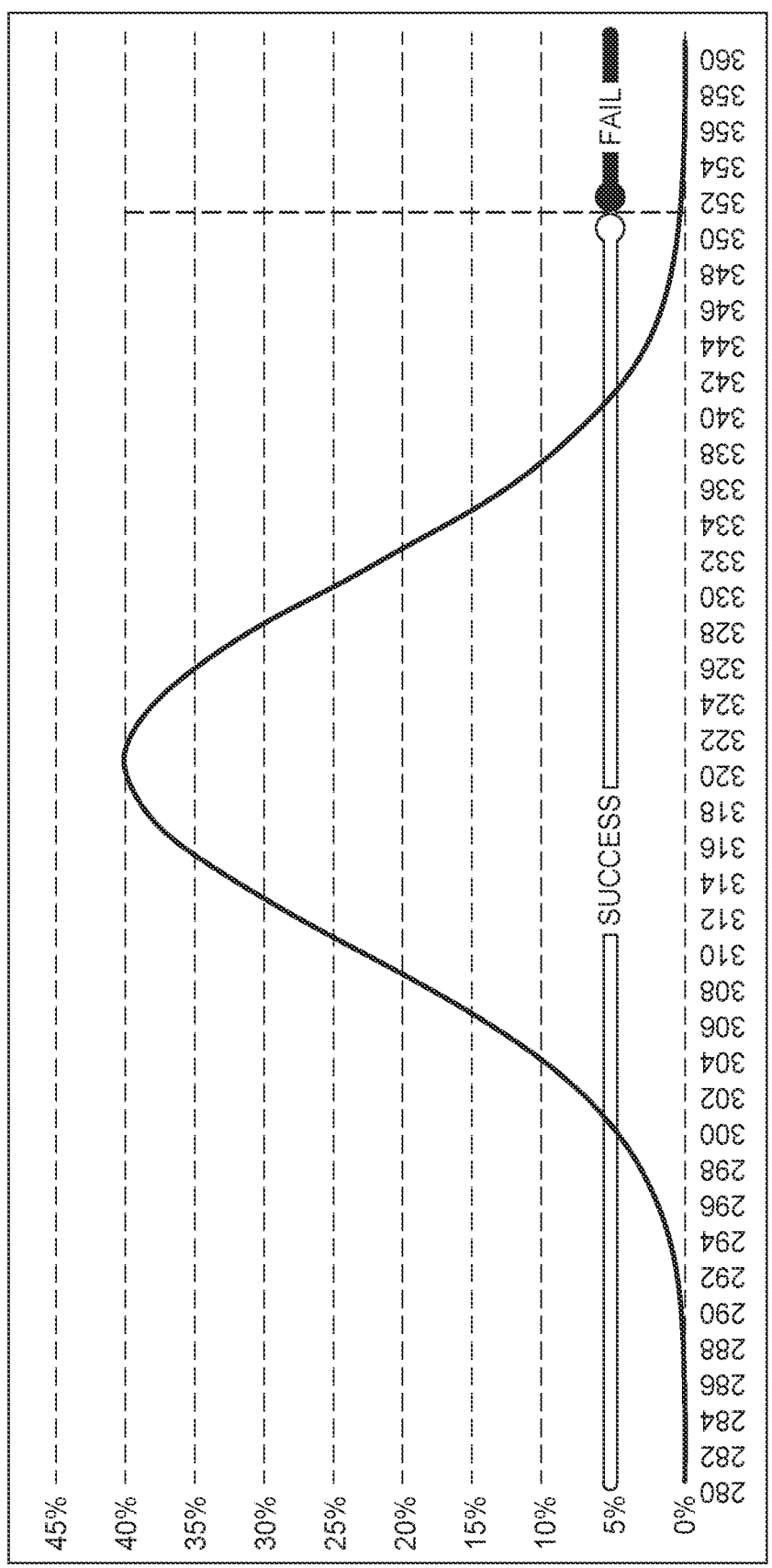
FIG. 3 is a graph illustrating a distribution of status ready utilizing a constant prediction.

As noted above, effective bus utilization leads to more efficient operations of the data storage device. In typical operation, each command or task is sent to the memory device of the data storage device through the FIM, which includes a low level flash sequencer that contains reference to a parameter table that contains some prediction timing to avoid early status checking of the bus between the FIM and the memory device. One example of prediction timing is to utilize a constant timing so that the status check of the data bus occurs at routine intervals. Sigma-3 value is one example of constant timing, and the sigma-3 value can be updated per memory device time/trim. FIG. 3 is a graph illustrating a distribution of status ready utilizing a constant prediction. As shown in FIG. 3 using sigma-3 as the constant timing, the constant timing is selected so that a great majority of the status checks fall within the bell curve area of the graph and are thus, successful (i.e., the data bus is not busy). There are, however, a few failures where the status check results in an indication that the data bus is busy. FIG. 3 illustrates the normal distribution of time of status ready of the memory device using sigma-3 as a constant prediction. The sigma-3 prediction usually works, but, due to the constant prediction value, wastes valuable time when not sending status checks at times when the data bus may be available.

An adaptive prediction model can overcome the shortcomings of the constant prediction. For an adaptive prediction model, the FIM will update the timers whenever there is a failure or a success in the status check. More specifically, an early/late ratio is defined and the time is set with the correct steps. Stated another way, the early/late ratio is defined by (1) selecting the correct amount to increase the timer (i.e., send status request early) if the status check is not late and hence successful and (2) selecting the correct amount to decrease the timer (i.e., send status request later) if the status check is too early and hence not successful. For example, when there is a preference for 100 late requests for every 1 early request, after every status check the timer will be adjusted accordingly. In such a scenario, for every successful status check, the timer is reduced by 1 while for every unsuccessful status check, the timer is increased by 100. In such an adaptive scenario, an incorrect small value (i.e., too short of a timer) will be fixed very fast while a wrong high value (i.e., too long of a timer) will be fixed slowly to the optimal location.

Figure 4:
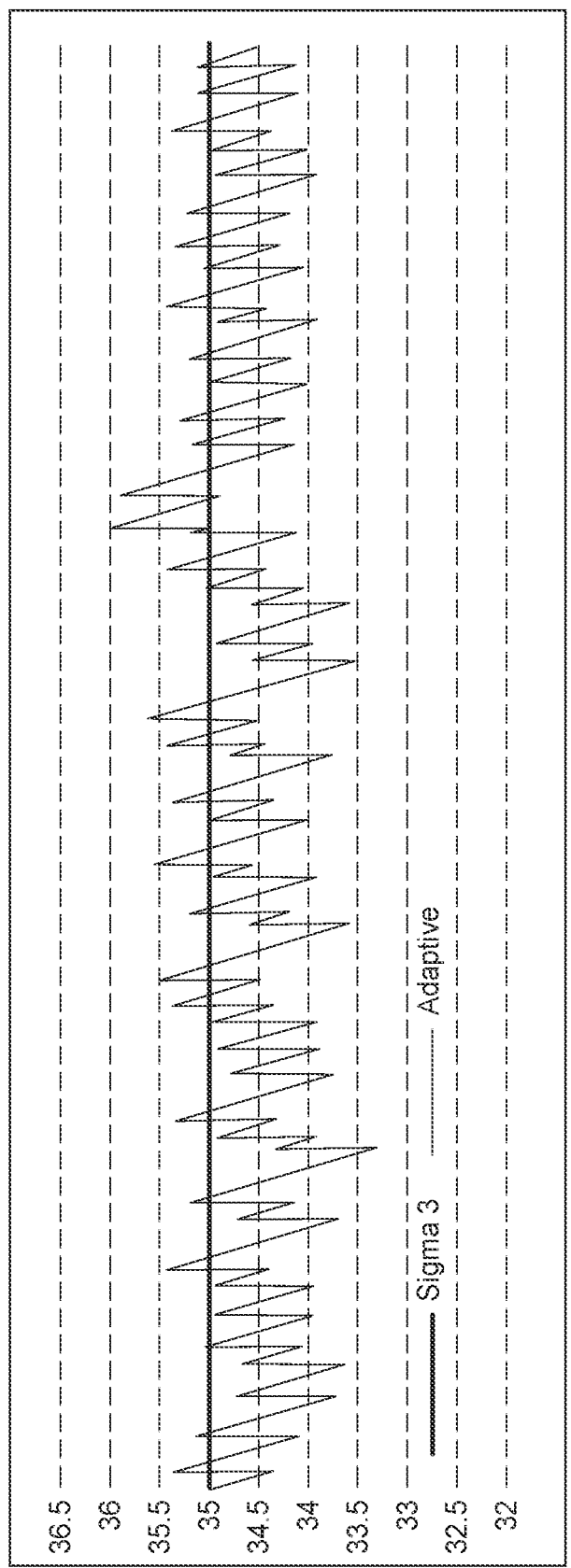
FIG. 4 is a graph illustrating a comparison of utilizing a constant prediction and an adaptive prediction.

FIG. 4 is a graph illustrating a comparison of utilizing a constant prediction and an adaptive prediction. As shown in FIG. 4, the sigma-3 sends status checks at a constant time while the adaptive approach sends status checks at different times based upon the success/failure of the status checks. For FIG. 4, successful status checks result in a decrease of 0.01 microseconds for the timer while unsuccessful status checks result in an increase of 1 microsecond for the timer. The adaptive timer results in a saw tooth-like pattern while the constant timer is a straight line.

When the memory device is ready earlier than the prediction (either using a constant timer or an adaptive timer), the data storage device wastes time from the actual ready time to the predicted time. When the prediction is too small (i.e., status request sent too early), the data storage device suffers some penalty. The adaptive timer using the prediction mechanism is aimed to minimize the wasted time.

Figure 5:
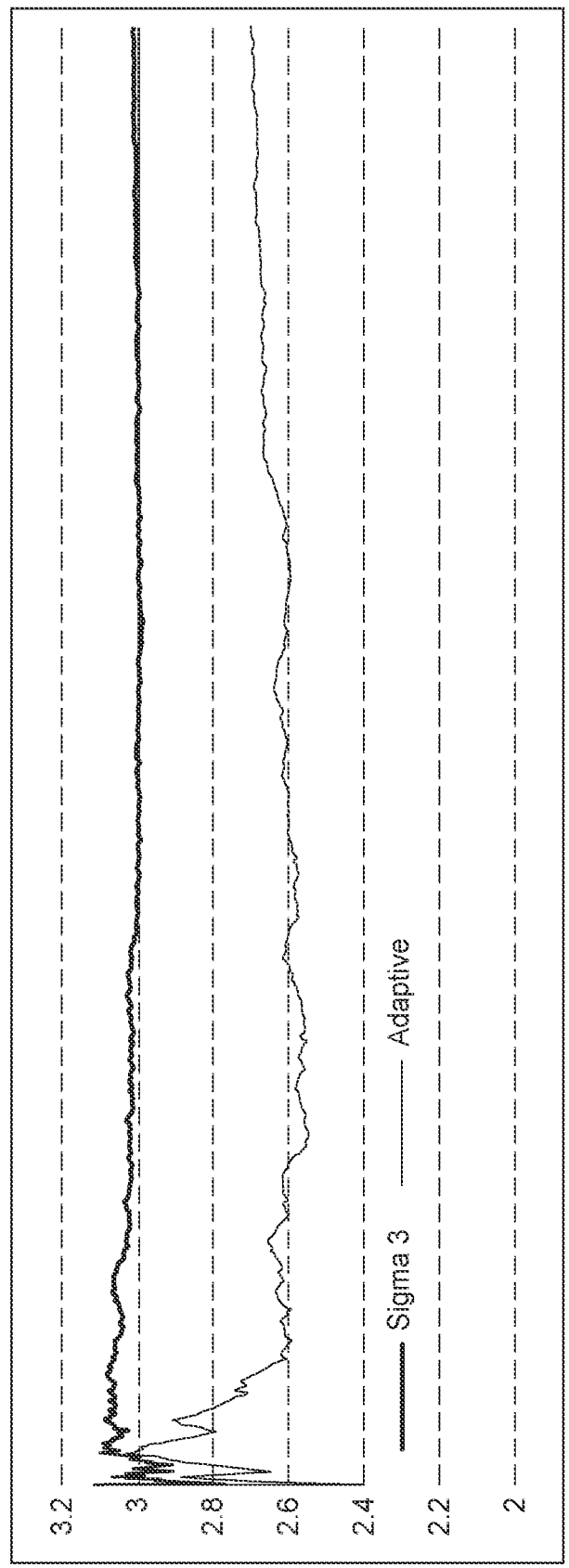
FIG. 5 is graph illustrating a comparison of wasted time for a constant prediction and an adaptive prediction.

To appreciate the amount of wasted time when not sending a status request while the memory device is ready, assume a penalty of 10-20 microseconds for every early prediction, which would impact both the adaptive timer as well as the constant timer equally. However, the adaptive timer would receive the benefit of decreasing the timer for each successful status check that a constant timer does not receive. Based upon the assumption, the constant timer (i.e., sigma-3) wastes 0.3 microseconds on average more than the adaptive timer. FIG. 5 is graph illustrating a comparison of average wasted time for a constant prediction and an adaptive prediction. For the constant timer, the wasted time converges to 3 microseconds while the adaptive timer converges to 2.7 microseconds as shown in FIG. 5 (i.e., 0.3 microseconds saved). Hence, while the adaptive timer results in more unsuccessful status checks (i.e., failures) as compared to the constant timer, the time savings on the successful status checks decreases the amount of wasted time for the adaptive timer relative to the constant timer.

Figure 6:
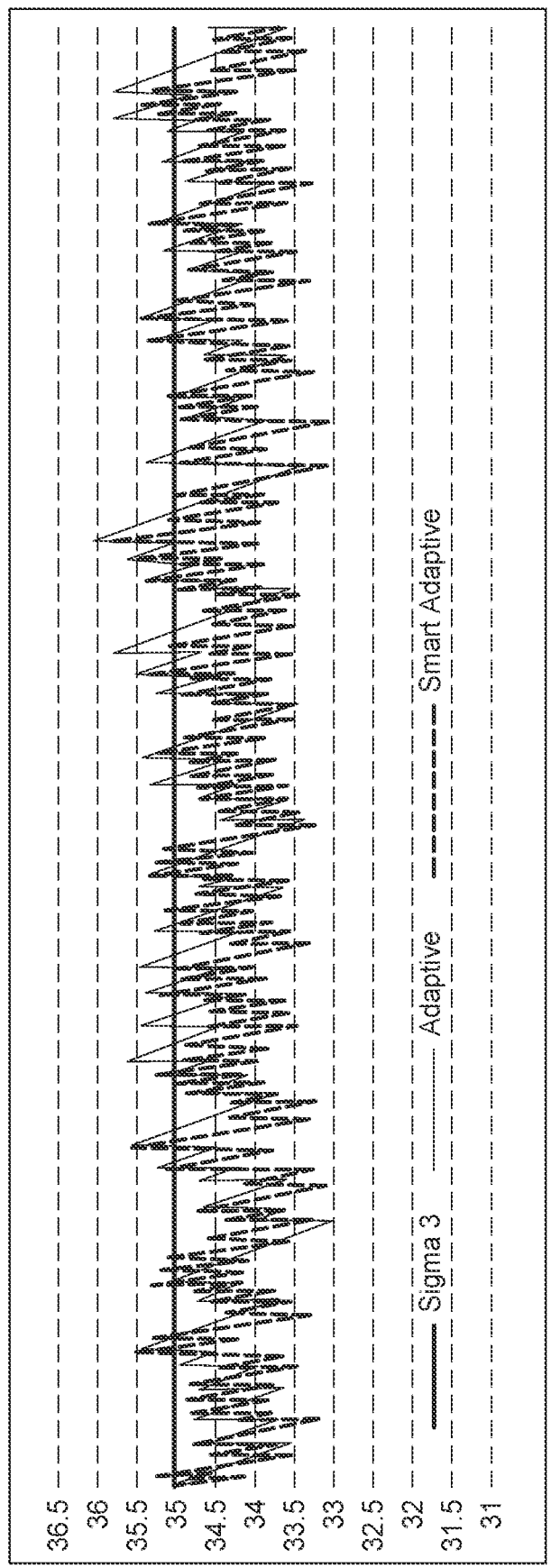
FIG. 6 is a graph illustrating a comparison of utilizing a constant prediction, an adaptive prediction, and a smart adaptive prediction.

It is contemplated that the adaptive timer can be improved by an additional adaptive element to make the adaptive timer a smart adaptive timer. For example, rather than having a set value for decreasing the timer when the status request is successful (e.g., 0.01 microseconds above), the decrease can be adaptive as well. For example, the value to decrease can be equal to the current timer value minus the mean timer value and then dividing by 100. FIG. 6 is a graph illustrating a comparison of utilizing a constant prediction, an adaptive prediction, and a smart adaptive prediction. As shown in FIG. 6, while both the adaptive prediction and the smart adaptive prediction have saw tooth-like patterns, the smart adaptive predictor has sharper saw teeth compared to the adaptive prediction. The smart adaptive predictor has fewer failures (i.e., early status requests) as compared to the adaptive prediction though the number of failures for the smart adaptive prediction may still be greater than the constant timer.

Figure 7:
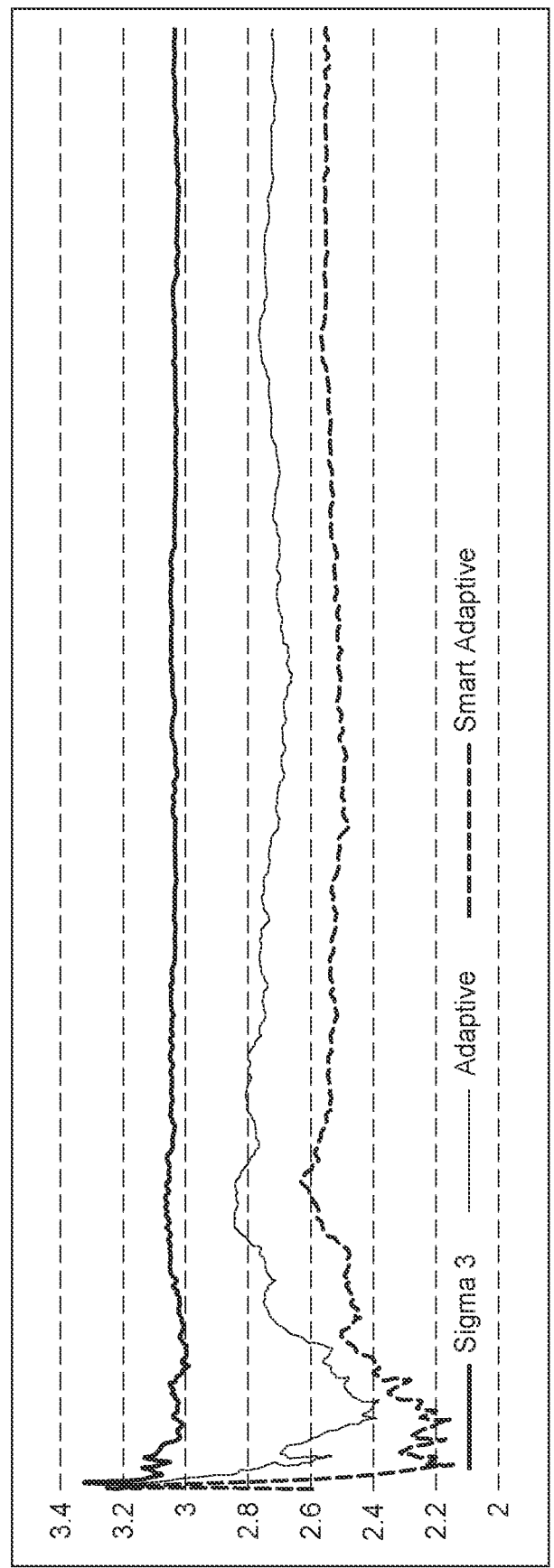
FIG. 7 is graph illustrating a comparison of wasted time for a constant prediction, an adaptive prediction, and a smart adaptive prediction.

With such an adaptive decrease in the timer, the wasted time can decrease even further. FIG. 7 is graph illustrating a comparison of wasted time for a constant prediction, an adaptive prediction, and a smart adaptive prediction. Using the same value as discussed above for the penalty of an unsuccessful status check, and the same decrease value of 0.01 for a successful status check on the adaptive prediction, the smart adaptive prediction results in even less wasted compared to the adaptive predictor. For the constant timer, the wasted time converges to 3 microseconds while the adaptive timer converges to 2.7 microseconds and the smart adaptive timer converges to 2.5 microseconds as shown in FIG. 7 (i.e., a savings of 0.5 microseconds over the constant timer and 0.2 microseconds over the adaptive timer). Hence, both the adaptive prediction model and the smart adaptive prediction model offer time savings over the constant timer model. Thus, more efficient operation of the data storage device is achieved. It is to be understood that the values used herein are for exemplification purposes. Thus, the amount of increase or decrease in the adaptive prediction model may be changed based upon desired user preferences. Similarly, the amount of increase or decrease formula for the smart adaptive prediction model may be changed based upon desired user preferences.

Figure 8:
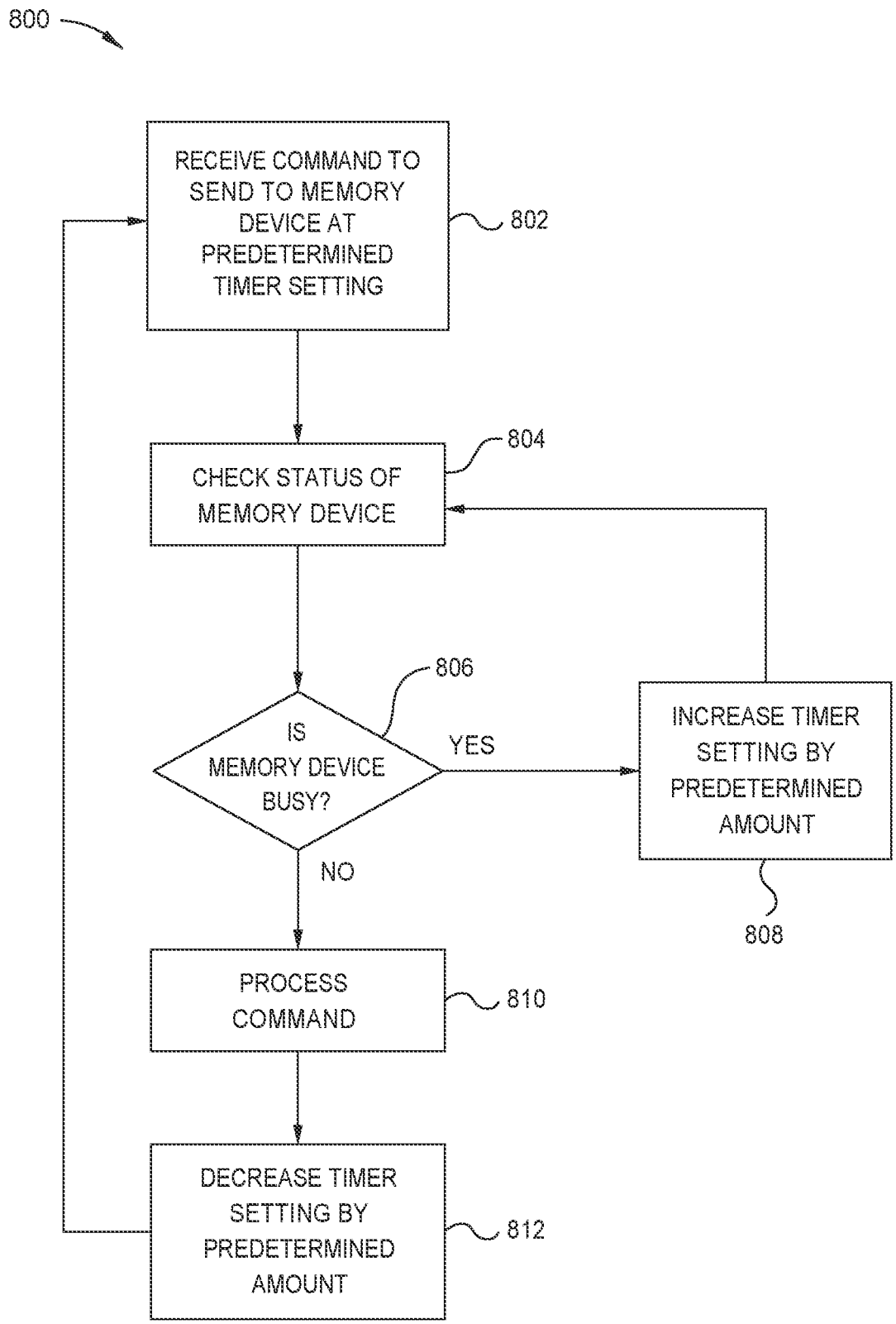
FIG. 8 is a flowchart illustrating an adaptive prediction model according to one embodiment.

FIG. 8 is a flowchart 800 illustrating an adaptive prediction model according to one embodiment. Initially, the data storage device receives a command at 802. The command involves the controller interacting with the memory device through the data bus using FIM. The command is to be sent to the memory device through the FIM over the data bus at a predetermined time set by a timer. Prior to sending the command for processing, the FIM checks the status of the memory device at 804. If the memory device is busy at 806, then the predetermined time is increased by the timer by a predetermined amount at 808. The status is then rechecked after the new or updated predetermined time has been reached. Once the memory device is not busy at 806, the command is processed at 810 and the timer is decreased by a predetermined amount at 812. The data storage device then waits for another command or retrieves the next command from a queue for processing at 802. The predetermined amount of time to increase the timer and the predetermined amount of time to decrease the timer may be different. It is to be noted that when a check status signal is sent to the memory device, the signal is sent over the data bus and hence, delays usage of the data bus by other memory devices coupled to the data bus. Hence, correctly predicting the availability of one memory device impacts QoS for other data devices that are coupled to the same data bus.

Figure 9:
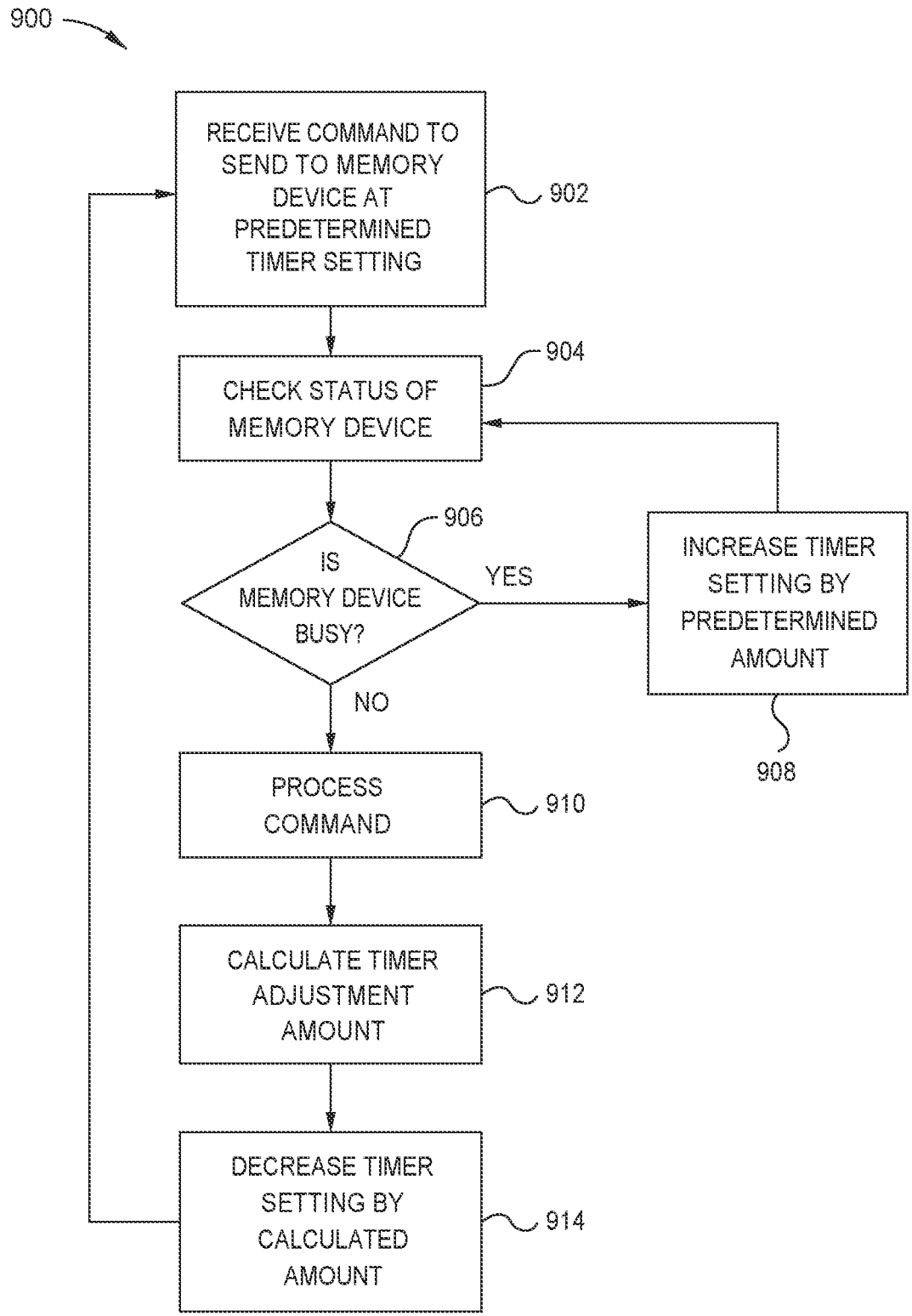
FIG. 9 is a flowchart illustrating an adaptive prediction model according to another embodiment.

FIG. 9 is a flowchart 900 illustrating an adaptive prediction model according to another embodiment. More specifically, the flowchart 900 illustrates the smart adaptive prediction model. Initially, the data storage device receives a command at 902. The command involves the controller interacting with the memory device through the data bus using FIM. The command is to be sent to the memory device through the FIM over the data bus at a predetermined time set by a timer. Prior to sending the command for processing, the FIM checks the status of the memory device at 904. If the memory device is busy at 906, then the predetermined time is increased by the timer by a predetermined amount at 908. The status is then rechecked after the new or updated predetermined time has been reached. Once the memory device is not busy at 906, the command is processed at 910.

The timer adjustment amount if then calculated at 912, and the timer is decreased by a predetermined amount at 914. The data storage device then waits for another command or retrieves the next command from a queue for processing at 902.

It is to be understood that in operation, the status is monitored by setting the timer immediately after sending the command to the memory device. Thus, the status is checked before sending the new command to the memory device, and is monitored after sending the command to the memory device so that the next command can be sent as soon as possible.

By adaptively adjusting the value of a timer, the availability of the memory device can be more accurately predicted. The value is increased if the memory device is busy, yet decreased if the memory device is not busy. Adaptively adjusting the value of the timer may result in a greater number of busy indications for the memory device as compared to a static value of the timer, but the latency savings of communicating at a faster rate than the static value of the timer more than offsets any detriments of the greater number of busy indications.

In one embodiment, a data storage device comprises: a memory device; and a controller coupled to the memory device via a data bus, wherein the controller is configured to: set a value for a timer that predicts availability of the memory device; receive a first command; check status of the memory device; determine the memory device is available; process the first command; and decrease the value of the timer. Decreasing the value of the timer decreases the value by a predetermined amount. The controller is further configured to: receive a second command; check the status of the memory device; determine the memory device is not available; and increase the value of the timer. Increasing the value of the timer increases the value by a predetermined amount. Determining the memory device is not available incurs a delay in processing the command of between about 10 microseconds to about 20 microseconds. Decreasing the value of the timer decreases the value by a calculated amount. The calculated amount is a function of a mean of previous timer values. The value of the timer is updated by a flash interface module (FIM) disposed in the controller.

In another embodiment, a data storage device comprises: a memory device; and a controller coupled to the memory device via a data bus, wherein the controller is configured to: set a value for a timer that predicts availability of the memory device; receive a first command; check status of the memory device; determine the memory device is not available; and increase the value of the timer. The controller is further configured to: determine the memory device is available; and decrease the value of the timer. Increasing and/or decreasing the value of the timer is by a predetermined amount. The predetermined amount is different for the increasing as compared to the decreasing. The predetermined amount for the increasing is about 1 microsecond and the predetermined amount for the decreasing is about 1/x microseconds, where x is the target for late predictions per every early prediction. The increasing the value of the timer is by a predetermined amount and the decreasing is by a calculated amount. The improved performance is improved quality of service (QoS) by decreasing idle time between processing commands.

In another embodiment, a data storage device comprises: memory means; a controller coupled to the memory means, wherein the controller is configured to: send commands to the memory means for processing; coordinate timing of sending the commands to the memory means; and adaptively adjusting timing of sending the commands based upon determining whether the memory means is busy. The adaptively adjusting timing comprises increasing an amount of time between sending commands upon determining that the memory means is busy and decreasing the amount of time between sending commands upon determining the memory means is not busy. The decreasing comprises decreasing the amount of time by a value equal to: (current amount of time between sending commands−mean of previous amounts of time between sending commands)/X, where "X" is a target for late predictions per every early prediction. The controller is configured to check a status of the memory means prior to sending commands to the memory means; and monitor the status of the memory means after sending commands to the memory means so that a next command can be sent to the memory means as soon as possible.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
   a memory device; and
   a controller coupled to the memory device via a data bus, wherein the controller is configured to:
   set a value for a timer that predicts availability of the memory device;
   receive a first command;
   send the command for processing to the memory device;
   check status of the memory device;
   determine the memory device is available; and
   decrease the value of the timer, wherein a value of the decrease is equal to a current timer value minus a mean timer value and then divided by 100.

2. The data storage device of claim 1, wherein decreasing the value of the timer decreases the value by a predetermined amount.

3. The data storage device of claim 1, wherein the controller is further configured to:
   receive a second command;
   send the command for processing to the memory device;
   check the status of the memory device;
   determine the memory device is not available; and
   increase the value of the timer.

4. The data storage device of claim 3, wherein increasing the value of the timer increases the value by a predetermined amount.

5. The data storage device of claim 1, wherein a plurality of memory devices are coupled to the controller.

6. A data storage device, comprising:
   a memory device; and
   a controller coupled to the memory device via a data bus, wherein the controller is configured to:
   set a value for a timer that predicts availability of the memory device;
   receive a first command;
   send the command for processing to the memory device;
   check status of the memory device;
   determine the memory device is available; and
   decrease the value of the timer, wherein the controller is further configured to:
   receive a second command;
   send the command for processing to the memory device;

check the status of the memory device;
determine the memory device is not available; and
increase the value of the timer, wherein determining the memory device is not available incurs a delay to other memory devices using the same data bus.

7. The data storage device of claim 1, wherein decreasing the value of the timer decreases the value by a calculated amount.

8. A data storage device, comprising:
a memory device; and
a controller coupled to the memory device via a data bus, wherein the controller is configured to:
set a value for a timer that predicts availability of the memory device;
receive a first command;
send the command for processing to the memory device;
check status of the memory device;
determine the memory device is available; and
decrease the value of the timer, wherein decreasing the value of the timer decreases the value by a calculated amount, wherein the calculated amount is a function of a mean of previous timer values.

9. A data storage device, comprising:
a memory device; and
a controller coupled to the memory device via a data bus, wherein the controller is configured to:
set a value for a timer that predicts availability of the memory device;
receive a first command;
send the command for processing to the memory device;
check status of the memory device;
determine the memory device is available; and
decrease the value of the timer, wherein the value of the timer is updated by a flash interface module (FIM) disposed in the controller.

10. A data storage device, comprising:
a memory device; and
a controller coupled to the memory device via a data bus, wherein the controller is configured to:
set a value for a timer that predicts availability of the memory device;
receive a first command;
check status of the memory device;
determine the memory device is not available; and
increase the value of the timer, wherein the controller is further configured to:
determine the memory device is available; and
decrease the value of the timer, wherein increasing and/or decreasing the value of the timer is by a predetermined amount, wherein the predetermined amount is different for the increasing as compared to the decreasing, wherein the predetermined amount for the increasing is about 1 microsecond and the predetermined amount for the decreasing is about 1/x microseconds, where x is a target for late predictions per every early prediction.

11. The data storage device of claim 10, wherein improved quality of service (QoS) results by decreasing idle time between processing commands.

12. A data storage device, comprising:
memory means;
a controller coupled to the memory means, wherein the controller is configured to:
send commands to the memory means for processing;
coordinate timing of sending the commands to the memory means; and
adaptively adjusting timing of sending the commands based upon determining whether a memory device is busy, wherein the adaptively adjusting timing comprises increasing an amount of time between sending commands upon determining that the memory device is busy and decreasing the amount of time between sending commands upon determining the memory device is not busy, wherein the decreasing comprises decreasing the amount of time by a value equal to:
(current amount of time between sending commands−precalculated expected mean of amounts of time between sending commands)/x, where x is a target for late predictions per every early prediction.

13. The data storage device of claim 12, wherein the controller is configured to check a status of the memory means prior to sending commands to the memory means; and monitor the status of the memory means after sending commands to the memory means so that a next command can be sent to the memory means as soon as possible.

14. The data storage device of claim 12, wherein the adaptively adjusting results in a saw tooth-like pattern when using an adaptive prediction.

15. The data storage device of claim 12, wherein an FIM will update the amount of time based on a failure in a status check.

16. The data storage device of claim 12, wherein an FIM will update the amount of time based on a success in a status check.

17. The data storage device of claim 16, wherein the FIM defines an early/late ratio to change a timer.

18. The data storage device of claim 17, wherein the early/late ratio comprises:
selecting a correct first amount to increase the timer if the status check is successful; and
selecting a correct second amount to decrease the timer if the status check is failed.

* * * * *